W. E. MOORE.
GIN SAW.
APPLICATION FILED MAY 4, 1908.

1,042,250.

Patented Oct. 22, 1912.

Witnesses
Harry King
William H. Chadwick

Inventor
W. E. Moore
By John H. Hall
His Attorney

COLUMBIA PLANOGRAPH CO., WASHINGTON, D. C.

UNITED STATES PATENT OFFICE.

WILLIAM E. MOORE, OF PITTSBURGH, PENNSYLVANIA.

GIN-SAW.

1,042,250.

Specification of Letters Patent.

Patented Oct. 22, 1912.

Application filed May 4, 1908. Serial No. 430,682.

*To all whom it may concern:*

Be it known that I, WILLIAM E. MOORE, a citizen of the United States, residing at Pittsburgh, in the county of Allegheny and State of Pennsylvania, have invented certain new and useful Improvements in Gin-Saws, of which the following is a specification.

This invention has for its primary object the providing of a gin saw the blades of which may be readily removed from their support in sections and new sections substituted with the least possible trouble commensurate with strength and general efficiency.

A further object of my invention is to provide a support for the gin saw blades of such a character as will permit of the use of a greater number of the saw blades and a longer saw cylinder than may be used with the ordinary form of gin saw support.

With the above ends in view my said invention consists in the novel features of construction herein described and more particularly pointed out in the accompanying claims.

In order to more fully describe my said invention reference will be had to the accompanying drawings wherein:—

Figure 1:
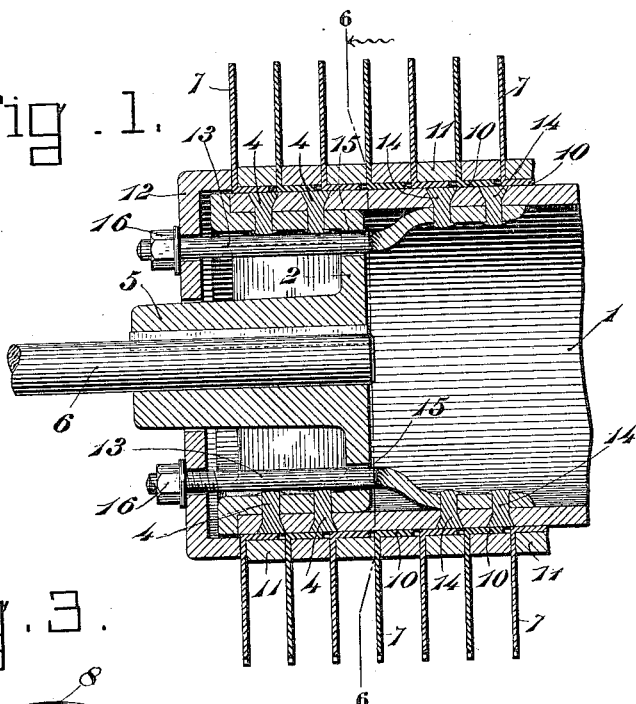
Figure 4:
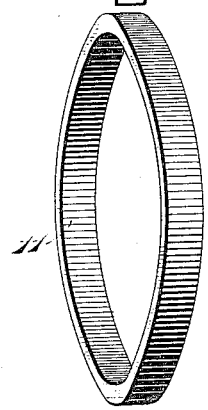
Figure 3:
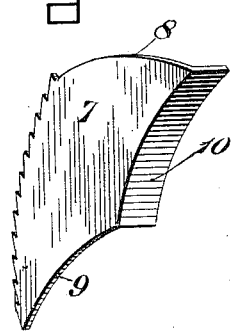
Figure 2:
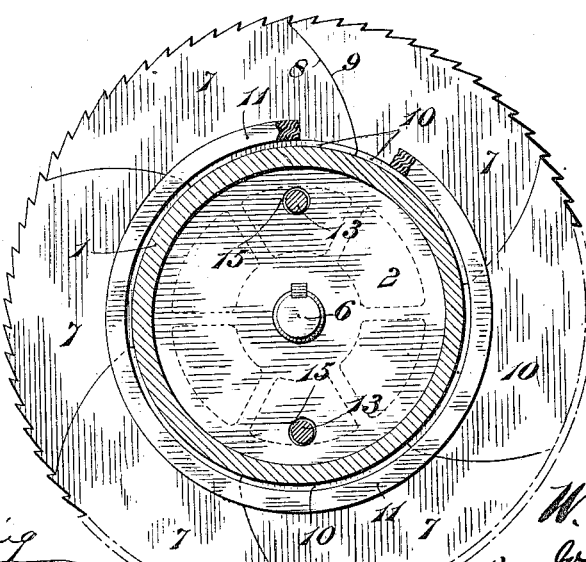

Figure 1, represents in vertical longitudinal central section one end of a gin saw cylinder and blades embodying my present invention, Fig. 2, a cross section of the same taken on line 2—2 Fig. 1, looking to the left, Fig. 3, a perspective view of one of the saw segments, and Fig. 4, a perspective view of one of the space rings.

Referring to the accompanying drawings, in which the same parts are indicated by similar numerals throughout the several views, 1 represents the supporting cylinder for the gin saws which, in the case shown, is a metal tubular shaft. In each end of this tubular shaft is forced a preferably cast iron head 2, secured to the said shaft by means of the rivets 4, 4. For additional strength, these heads may also be brazed to the tubular shaft 1.

It is assumed in the form of the invention shown that the parts at the two ends of the saw cylinder are duplicates, so that one end only is shown.

Each head 2 is provided with a central hub 5 in each of which is keyed a supporting shaft 6 in line with the longitudinal axis of the tube 1.

The saw blades are made up of a plurality of segments 7, the forward and the rear edges 8 and 9 of the said segments being preferably curved backward substantially as shown. The inner edge of each of these segments is provided with a flange 10 adapted to conform with the outer periphery of the shaft 1, and to rest thereagainst when in position on said shaft. These saw blade segments are held rigidly in position by slip rings 11 inserted between adjacent saw blades, the internal diameter of said rings being such as to allow the flanges 10 of the segments to fit tightly between the said rings and the shaft 1.

The slip rings and the saw blades are clamped together longitudinally of the shaft 1, by means of the cup washer 12 at each end of the said saw cylinder, the said washer being held by means of bolt arms 13 made fast to the interior of shaft 1 as by rivets 14, 14 and extending through apertures 15, 15 in the head 2 and provided at their outer ends with tightening nuts 16, 16.

In the ordinary construction of gin saws, should a blade in the middle of the saw cylinder, for example, become damaged it is necessary to remove at least one half of the gin saw blades in order to get the damaged one off.

With a gin constructed according to my invention it is only necessary to loosen cup collar 12 when the saws may be readily shifted in the direction of the loosened collar to permit the injured saw to be removed. Moreover, great economy is had by making the saw blades separately replaceable segments, such for example as herein shown. When each saw blade is an integral structure, damage to a portion only of the saw necessitates the throwing away of the whole saw blade. When made in separate replaceable sections the damaged section only need be throw away. Also, in gins as ordinarily constructed, the cylinders on which the saw blades are mounted are solid and are so flexible that they are necessarily of very limited length, thereby limiting the capacity of the gin. I overcome this defect by making the saw-blade supporting cylinder in the form of a tubular metal shaft, which is both light and stiff. This construction permits of the use of a much longer cylinder which means increased gin capacity.

Having described one specific form of my invention, what I claim is:—

1. The combination with a shaft, of a plurality of gin saw blades mounted on the periphery of said shaft, said blades comprising each a plurality of separable segments having offset bases resting on said shaft, slip rings inserted between adjacent saw blades and encircling and binding said bases against the periphery of said shaft, and mechanism to clamp said blades longitudinally of said shaft.

2. A gin saw, comprising a supporting shaft, a plurality of gin saw blades mounted on the outside of said shaft, said blades each being composed of a plurality of separable flanged segments, slip rings inserted between adjacent saw blades, encircling and engaging the flanges of said blades and binding them against the exterior of said shaft, and clamping mechanism acting to clamp the said saw blades and rings together longitudinally of said shaft.

3. The combination with a tubular shaft, of a plurality of gin saw blades mounted on the periphery of said shaft, said blades each being composed of a plurality of separable flanged segments, the said flanges resting on said shaft, slip rings inserted between adjacent saw blades and binding the flanges of said blades against the outer periphery of said shaft, clamping mechanism acting to clamp the said saw blades and rings together longitudinally of said shaft, supporting shafting for said tubular shaft, and means for mounting the tubular shaft on the supporting shafting.

4. The combination with a gin saw shaft having a hollow end, of a plurality of detachable gin saw blades mounted thereon, a plurality of tie bolts secured to the wall of said shaft within said hollow end, a movable clamping head through which said bolts are adapted to extend, and nuts mounted on said bolts exterior to said clamping head adapted to force said head toward said saw blades, substantially as described.

5. The combination with a gin saw shaft, of a plurality of detachable gin saw blades mounted thereon, said blades each being composed of a plurality of separable flanged segments, removable retaining devices passing over said flanges and binding them against the periphery of said shaft, tie bolts and clamping heads coöperating therewith and acting axially of said shaft to clamp said blades and retaining devices together.

In testimony whereof I affix my signature in presence of two witnesses.

WILLIAM E. MOORE.

Witnesses:
S. A. GILMORE,
M. E. CONNER.